United States Patent [19]
Horton et al.

[11] Patent Number: 6,094,188
[45] Date of Patent: Jul. 25, 2000

[54] RADIO FREQUENCY TRACKING SYSTEM

[75] Inventors: Robert Horton, Bakersfield; Jean-Jacques Grimaud, Portola Valley; Daniel Maddy, Cupertino; Michael Teitel, Portola Valley, all of Calif.

[73] Assignee: Sun Microsystems, Inc., Palo Alto, Calif.

[21] Appl. No.: 08/354,018

[22] Filed: Dec. 5, 1994

Related U.S. Application Data

[63] Continuation-in-part of application No. 08/155,359, Oct. 6, 1993, abandoned, which is a continuation of application No. 07/863,312, Mar. 20, 1992, abandoned, which is a continuation of application No. 07/621,447, Nov. 30, 1990, abandoned.

[51] Int. Cl.[7] ...................................................... G09G 5/08
[52] U.S. Cl. ............................ 345/158; 345/156; 434/45
[58] Field of Search ..................................... 345/156, 157, 345/158, 163–166; 341/31, 20, 22; 340/825.22, 825.19, 407.01, 407.02; 342/126; 434/45

[56] References Cited

U.S. PATENT DOCUMENTS

| | | | |
|---|---|---|---|
| 4,303,910 | 12/1981 | McCann | 340/572 |
| 4,352,098 | 9/1982 | Stephen et al. | 340/572 |
| 4,688,037 | 8/1987 | Krieg | 340/825.72 |
| 5,021,765 | 6/1991 | Morgan | 340/572 |

FOREIGN PATENT DOCUMENTS

| | | | |
|---|---|---|---|
| 312481 | 4/1989 | European Pat. Off. | |
| 59-117631 | 7/1984 | Japan | 345/158 |
| 62-8009 | 1/1987 | Japan | |

*Primary Examiner*—Amare Mengistu
*Attorney, Agent, or Firm*—Conley, Rose & Tayon, PC; B. Noel Kivlin

[57] ABSTRACT

A method and apparatus is disclosed for transmitting data about an object within a defined field and using the transmitted data to generate a virtual object on the display screen of a computer. In one embodiment of the present invention the object used to transmit input data is a wireless glove assembly. The glove assembly supports a transmitting device which transmits data bursts, containing position and gesture information, in the radio frequency wavelength to four stationary receivers. The received signal is converted to a digital signal and input to a microprocessor control unit. The software used in the microprocessor control unit uses an averaging method to generate a virtual object on the computer display screen. The position of the virtual object is calculated based on the strength of the signal received. The movement of the virtual object on the computer display screen is in the same direction as and is proportional to the glove movement.

16 Claims, 14 Drawing Sheets

DIGITAL TRANSMITTER

DIGITAL RECEIVER

INTERFACE MODULE

INTERFACE MODULE

```
                                    Page 1
 1  ********************************
 2  * VERSION 5.50                  *
 3  * THREE DIMENSIONAL POSITIONING *
 4  * AND GESTURE RECOGNITION CODE  *
 5  * FOR THE COMMODORE 64/128      *
 6  * (C) COPYRIGHT 1987            *
 7  * BY ROBERT D HORTON            *
 8  * LAST UPDATE 5/14/87           *
 9  ********************************
10
11             ORG     $9B00
12
13  ********************************
14  * THIS ROUTINE MAY BE ASSEMBLED *
15  * ANYWHERE,BUT IF YOU CHANGE    *
16  * VIC CHIP VIDEO LOCATIONS YOU  *
17  * WILL HAVE TO CHANGE THE SPRITE*
18  * DATA POINTER,THE SPRITE DATA  *
19  * LOCATION TABLE,AND OF COURSE  *
20  * MOVE ALL THE SPRITE DATA      *
21  ********************************
21
22
23  *   JUMP TABLE
24
25             JMP     CONNECT       ;ENGAGE HARDWARE
26             JMP     DCONNECT      ;DISENGAGE HARDWARE
27
28  *   USER SOFTWARE INFORMATION LOCATIONS
29
30  OLDGEST    HEX     FF            ;READ HERE FOR THE CURRENT GESTURE
31  ZAXIS      HEX     00            ;READ HERE FOR THE CURRENT Z AXIS VALUE
32
33  *   NOTE:IF YOU WISH TO KNOW THE ACTUAL
34  *   SPRITE X AND Y LOCATIONS YOU MUST
35  *   READ THE SPRITE POSITION REGISTERS
36  *   BUT BE AWARE THAT THE SPRITES ARE
37  *   OFFSET 11 BITS TO THE LEFT AND 10 BITS
38  *   UP TO ALIGN THE IMAGES WITH THE CENTER
39  *   OF THE SCREEN
40
41  *   ACTIVATE GLOVE
42
43  CONNECT SEI                      ;SET NEW INTERRUPT VECTOR
44             LDA     CINVLO
45             STA     OLDINVLO
46             LDA     CINVHI
47             STA     OLDINVHI
48             LDA     #<IRQMAIN
49             STA     CINVLO
50             LDA     #>IRQMAIN
51             STA     CINVHI
52             LDA     NMILO         ;SET NEW NMI VECTOR
53             STA     OLDNMILO
54             LDA     NMIHI
55             STA     OLDNMIHI
56             LDA     #<NMIMAIN
57             STA     NMILO
58             LDA     #>NMIMAIN
59             STA     NMIHI
```

CODE LISTING

FIG. 5

```
                               Page 2
 60            LDA    #$01
 61            STA    INTFLAG    ;RESET IRQ SOFTWARE FLAG
 62            STA    IRQFLAG    ;RESET HARDWARE IRG FLIP-FLOP
 63            ORA    SPENA      ;TURN ON SPRITE NUMBER 0
 64            STA    SPENA
 65            CLI
 66            RTS
 67
 68  *    INTERRUPT ROUTINE
 69
 70  *    NOTE :IF YOU ARE USING OTHER INTERRUPTS
 71  *    THIS COD E SHOULD BE EXECUTED FIRST
 72  *     DUE TO CRITICAL TIMING REQUIREMENTS
 73
 74  IRQMAIN   LDA    INTFLAG    ;ALREADY PROCESSING A GLOVE IRQ?
 75            BEG    IRQOUT
 76            LDA    IRQFLAG    ;GLOVE IRQ?
 77            AND    #$01
 78            BEQ    IRQOUT
 79            LDA    #$00       ;SET UP TO PROCESS GLOVE'S IRQ
 80            STA    COUNT
 81            STA    GESTURE
 82            STA    INTFLAG
 83            LDX    #$05       ;HI BYTE FOR TIMER
 84            LDY    #$00       ;LO BYTE FOR TIMER
 85            JSR    SETIMER    ;SET TIMER TO DELAY INTO RECIEVED SIGNAL
 86            PLA               ;IRQ RETURN ROUTINE-RESTORE 6510 REGISTERS
 87            TAY
 88            PLA
 89            TAX
 90            PLA
 91            RTI
 92
 93  IRQOUT    JMP    (OLDINVLO ) ;DO SYSTEM IRQ ROUTINE
 94
 95  *    NON -MASKABLE INTERRUPT ROUTINE
 96
 97  *    NOTE :IF YOU ARE USING OTHER NMI'S
 98  *     YOU WILL HAVE TO MODIFY THIS ROUTINE
 99  *     BUT YOU MUST EXECUTE THIS CODE FIRST
100  *     DUE TO CRITICAL TIMING REQUIREMENTS
101
102  NMIMAIN   PHA               ;SAVE 6510 REGISTERS
103            TXA
104            PHA
105            TYA
106            PHA
107            LDA    C12ICR
108            BEQ    NMIOUT     ;IF NOT CIA2 NMI GET OUT
109            AND    #$01
110            BEQ    NMIOUT     ;IF NOT TIMER A FLAG GET OUT
111            LDA    COUNT
112            BNE    NMIMAIN2   ;IF NOT 0 READ RECEIVERS FOR FINGER DATA
113            LDX    #$05       ;TIMER HI BYTE
114            LDY    #$30       ;TIMER LO BYTE
115            JSR    SETIMER    ;SET TIMER TO GET FINGERS NEXT
116            LDY    #$03
```

FIG. 5 (Cont.)

Page 3

```
117 NMIMAIN1  JSR     GETIT      ;READ A/D CHANNEL
118           CLC                ;AVERAGE WITH LAST RF VALUE
119           ADC     RECVO,Y
120           ROR
121           STA     RECVO,Y    (GET POSITIONAL DATA)
122           DEY
123           BPL     NMIMAIN1
124           INC     COUNT
125           CMP     NMIOUT
126 NMIMAIN2  CMP     #$06       ;CHECK IF LAST FINGER HAS BEEN DONE
127           BEQ     CHKREC
128           LDX     #$04       ;HI BYTE FOR TIMER
129           LDY     #$80       ;LO BYTE FOR TIMER
130           JSR     SETIMER    ;SET TIMER FOR NEXT FINGER
131           LDY     #$04       ;SELECT A/D CHANNEL #4
132           JSR     GETIT      ;GET FINGER DATA FROM A/D CONVERTOR
133           CMP     #$85       ;COMPARE TO RECIEVE LIMIT
134           BCS     NMIMAIN4   ;FINGER WAS OPEN
135           LDX     COUNT      ;MAKE A BIT FOR A CLOSED FINGER
136           LDA     #$00
137           SEC
138 NMIMAIN3  ROL
139           DEX
140           BNE     NMIMAIN3
141           ORA     GESTURE
142           STA     GESTURE    ;STORE NEW BIT IN GESTURE VARIABLE
143 NMIMAIN4  INC     COUNT
144 NMIOUT    PLA                ;NMI RETURN ROUTINE-RESTORE 6510 REGISTERS
145           TAY
146           PLA
147           TAX
148           PLA
149           RTI
150
151 * CHECK THAT ALL RECEIVERS HAVE A SIGNAL GREATER THAN $07
152 * AND SAVE THE GREATEST RECEIVER RF VALUE
153
154 CHKREC    LDY     #$03
155           STY     HIREC      ;INITIALIZE HIREC VALUE
156 CHKRECI   LDA     RECVO,Y
157           CMP     #$07
158           BCS     CHKREC2
159           JMP     DOGEST2    ;END ROUTINE IF ANY RECEIVER BELOW CLIP
160 CHKREC2   CMP     HIREC
161           BCC     CHKREC3
162           STA     HIREC      ;SAVE GREATEST RECEIVER RF VALUE
163 CHKREC3   DEY
164           BPL     CHKRECI
165
166 * CALCULATE Z AXIS BY AVERAGING ALL RECEIVERS
167
168           CLC                ;AVERAGE 2 RECEIVERS
169           LDA     RECVO
170           ADC     RECVI
171           ROR
172           STA     REG1
173           CLC                ;AVERAGE THE OTHER 2 RECEIVERS
```

FIG. 5 (Cont.)

Page 4

```
174            LDA    RECV2
175            ADC    RECV3
176            ROR
177            STA    REG2
178            CLC                  ;AVERAGE BOTH AVERAGES
179            ADC    REG1
180            ROR
181            STA    REG3
182            SEC                  ;COMPUTE Z AXIS VALUE
183            LDA    #$B0          ;Z AXIS SCALING VALUE
184            SBC    REG3
185            BCS    ZOK
186            JMP    DOGEST2       ;GLOVE TO CLOSE TO RECEIVERS,END ROUTINE
187 ZOK        CLC                  ;AVERAGE WITH LAST Z AXIS VALUE
188            ADC    ZAXIS
189            ROR
190            STA    ZAXIS
191
192 * OPTIMIZE ALL RECEIVER READINGS
193
194 * FORMULA=((RECV(0-3)*(SCALING VALUE))/HIREC)
195
196            LDX    #$03
197 OPTIMIZE   JSR    CLEAR         ;CLEAR MATH REGISTERS
198            LDA    RECV0,X       ;GET RECEIVER RF VALUES
199            STA    REG1
200            LDA    #$FF          ;OVERALL SCALING VALUE
201            STA    REG2
202            JSR    MULTIPLY
203            LDA    #$00
204            JSR    CLEAR1
205            LDA    HIREC
206            STA    REG2
207            JSR    DIVIDE
208            LDA    REG1
209            STA    RECV0,X       ;PUT BACK OPTIMIZED RECEIVER RF VALUES
210            DEX
211            BPL    OPTIMIZE
212
213 * CALCULATE X POSITION
214
215 * RIGHT=((RECV2+RECV3)/2)
216 * LEFT=((RECV0+RECV1)/2)
217 * X POSITION=CENTER+RIGHT
218 * OR
219 * X POSITION=CENTER-LEFT
220
221            CLC                  ;ADD RECV0 AND RECV1 THEN DIVIDE BY 2
222            LDA    RECV0
223            ADC    RECV1
224            ROR
225            STA    REG1          ;REG1 HOLDS LEFT VALUE
226            CLC                  ;ADD RECV2 AND RECV3 THEN DIVIDE BY 2
227            LDA    RECV2
226            ADC    RECV3
229            ROR
230            STA    REG2          ;REG2 HOLDS RIGHT VALUE
```

FIG. 5 (Cont.)

Page 5

```
231            CMP       REG1        ;WHICH IS GREATER RIGHT OR LEFT?
232            BCC       GOLEFT
233            SEC                   ;GET DIFFERENCE OF RIGHT MINUS LEFT
234            SBC       REG1
235            CLC                   ;ADD TO CENTER OF SCREEN TO GO RIGHT
236            ADC       #$AD
237            BCC       RESMISG
238            CMP       #$4C        ;IF GREATER THAN 255 COMPARE TO RIGHT CLIP
239            BCC       SETMISG
240            LDA       #$4C
241            JMP       SETMISG
242 GOLEFT     SEC                   ;GET DIFFERENCE OF LEFT MINUS RIGHT
243            LDA       REG1
244            SBC       REG2
245            STA       REG3
246            SEC                   ;SUBTRACT FROM CENTER OF SCREEN TO GO LEFT
247            LDA       #$AD
248            SBC       REG3
249            BCC       GOLEFT1
250            CMP       #$0D        ;CHECK IF GREATER THAN LEFT CLIP
251            BCS       RESMISG
252 GOLEFT1    LDA       #$0D
253 RESMISG    STA       SPOX        ;RESET MOST SIGNIFICANT X BIT OF SPRITE 0
254            LDA       MSIGX
255            AND       #$FE
256            STA       MSIGX
257            JMP       CALCY
258 SETMISG    STA       SPOX        ;SET MOST SIGNIFICANT X BIT OF SPRITE 0
259            LDA       MSIGX
260            ORA       #$01
261            STA       MSIGX
262
263 * CALCULATE Y      POSITION
264
265 * DOWN=((RECVO+RECV3)/2)
266 * UP=((RECV1+RECV2)/2)
267 * Y POSITION=CENTER-UP
268 * OR
269 * Y POSITION=CENTER+DOWN
270
271 CALCY      CLC                   ;ADD RECV1 AND RECV2 THEN DIVIDE BY 2
272            LDA       RECV1
273            ADC       RECV2
274            ROR
275            STA       REG1        ;REG1 HOLDS UP VALUE
276            CLC                   ;ADD RECVO AND RECV3 THEN DIVIDE BY 2
277            LDA       RECVO
278            ADC       RECV3
279            ROR
280            STA       REG2        ;REG2 HOLDS DOWN VALUE
281            CMP       REG1        ;WHICH IS GREATER DOWN OR UP?
282            BCC       GOUP
283            SEC                   ;GET THE DIFFERENCE OF DOWN MINUS UP
284            SBC       REG1
285            CLC                   ;ADD TO CENTER OF SCREEN TO GO DOWN
286            ADC       #$8C
287            BCS       GODOWN
```

FIG. 5 (Cont.)

Page 6

```
288              CMP      #$EF         ;CHECK IF LESS THAN DOWN CLIP
289              BCC      GODOWN1
290 GODOWN       LDA      #$EF
291 GODOWN1      STA      SPOY
292              JMP      DOGEST
293 GOUP         SEC                   ;GET THE DIFFERENCE OF UP MINUS DOWN
294              LDA      REG1
295              SBC      REG2
296              STA      REG3
297              SEC                   ;SUBTRACT FROM CENTER OF SCREEN TO GO UP
298              LDA      #$8C
299              SBC      REG3
300              BCC      GOUP1
301              CMP      #$28         ;CHECK IF GREATER THAN UP CLIP
302              BCS      GOUP2
303 GOUP1        LDA      #$28
304 GOUP2        STA      SPOY
305
306 * GESTURE RECOGNITION ROUTINE
307
309 DOGEST       LDA      GESTURE
309              CMP      OLDGEST
310              BEG      DOGEST4
311              LDY      #$06         ;CURRENT NUMBER OF GESTURES MINUS 1
312 DOGEST1      CMP      GTABLE,Y     ;SEE IF NEW GESTURE MATCHES ONE IN THE TABLE
313              BEQ      DOGEST3
314              DEY
315              BPL      DOGEST1
316 DOGEST2      LDA      #$00         ;IF GESTURE UNRECOGNIZED MAKE IT AN OPEN HAND
317              TAY
318 DOGEST3      STA      OLDGEST
319              LDA      STABLE,Y     ;GET SPRITE LOCATION DATA
320              STA      SPRLOC
321 DOGEST4      LDA      #$01
322              STA      INTFLAG      ;RESET SOFTWARE IRQ FLAG
323              STA      IRQFLAG      ;RESET HARDWARE IRQ FLIP FLOP
324              JMP      NMIOUT       ;LAST THING DONE IN THE ENTIRE ROUTINE
325
326 * MATH ROUTINES
327
328 MULTIPLY LDA          #$00         ;16 BIT MULTIPLICATION ROUTINE
329              STA      REG3+1
330              LDY      #$11
331 MLOOP        LSR      REG3+1
332              ROR
333              ROR      REG1+1
334              ROR      REG1
335              BCC      MLOOP1
336              CLC
337              ADC      REG2
338              PHA
337              ADC      REG2
338              PHA
339              LDA      REG2+1
340              ADC      REG3+1
341              STA      REG3+1
342              PLA
343 MLOOP1       DEY
344              BNE      MLOOP
```

FIG. 5 (Cont.)

Page 7

```
345              STA     REG3
346              RTS
347
348 DIVIDE       LDA     #$00        ;16 BIT DIVISION ROUTINE
349              STA     REG3+1
350              LDY     #$10
351 DLOOP        ASL     REG1
352              ROL     REG1+1
353              ROL
354              ROL     REG3+1
355              PHA
356              CMP     REG2
357              LDA     REG3+1
358              SBC     REG2+1
359              BCC     DLOOP1
360              STA     REG3+1
361              PLA
362              SBC     REG2
363              PHA
364              INC     REG1
365 DLOOP1       PLA
366              DEY
367              BNE     DLOOP
368              STA     REG3
369              RTS
370
371 CLEAR        LDA     #$00        ;CLEAR ALL MATH REGISTERS
372              STA     REG1
373              STA     REG1+1
374 CLEAR1       STA     REG2        ;CLEAR REG2 AND REG3 ONLY
375              STA     REG2+1
376              STA     REG3
377              STA     REG3+1
378              RTS
379
380 * GET DATA FROM A/D CONVERTOR
381
382 GETIT        STA     AD,Y        ;SELECT A/D CHANNEL
383              LDX     #$0B
384 WAIT         NOP                 ;WAIT APPROXIMATELY 100US
385              DEX
386              BPL     WAIT
387              LDA     AD          ;GET A/D VALUE
388              RTS
389
390 *SET CIA2 TIMER A
391
392 SETIMER      STY     T12AL0      ;SET NMI TIMER COUNT VALUES
393              STX     T12AHI
394              LDA     #$81        ;ENABLE TIMER A INTERRUPT
395              STA     CI2ICR
396              LDA     #$19        ;FORCE LOAD,ONE SHOT MODE,START TIMER A
397              STA     CI2CRA
398              RTS
399
400 * DEACTIVATE GLOVE
401
```

FIG. 5 (Cont.)

Page 8

```
402 DCONNECT  SEI
403            LDA    OLDINVLO ;RESTORE OLD IRQ VECTOR
404            STA    CINVLO
405            LDA    OLDINVHI
406            STA    CINVHI
407            LDA    OLDNMILO ;RESTORE OLD NMI VECTOR
408            STA    NMILO
409            LDA    OLDNMIHI
410            STA    NMIHI
411            LDA    SPENA    ;TURN OFF SPRITE NUMBER 0
412            AND    #$FE
413            STA    SPENA
414            CLI
415            RTS
416
417 * ROUTINE STORAGE AND TABLE LOCATIONS
418
419 INTFLAG   HEX    00       ;INTERRUPT IN-PROCESSING SOFTWARE FLAG
420 COUNT     HEX    00       ;COUNT FOR READ RECEIVERS OR WHICH FINGER
421 GESTURE   HEX    00       ;NEW GESTURE BEING MADE
422 RECV0     HEX    00       ;RECV0 THRU RECV3 ARE RECEIVER RF VALUES
423 RECV1     HEX    00
424 RECV2     HEX    00
425 RECV3     HEX    00
426 GTABLE    HEX    00       ;OPEN HAND
427           HEX    01       ;SALUTE
428           HEX    03       ;OK
429           HEX    19       ;2 FINGER POINT
430           HEX    1D       ;1 FINGER POINT
431           HEX    1E       ;THUMBS DOWN
432           HEX    1F       ;CLOSED FIST
433 STABLE    HEX    28       ;SPRITE DATA LOCATION TABLE
434           HEX    29
435           HEX    2A
436           HEX    2B
437           HEX    2C
439           HEX    2D
439           HEX    2E
440 HIREC     HEX    00       ;GREATEST RECEIVER RF VALUE
441 REG1      HEX    00       ;REG1-REG3 ARE CALCULATION WORKING LOCATIONS
442           HEX    00
443 REG2      HEX    00
444           HEX    00
445 REG3      HEX    00
446           HEX    00
447 OLDINVLO  HEX    00       ;OLD INTERRUPT VECTOR
448 OLDINVHI  HEX    00
449 OLDNMILO  HEX    00       ;OLD NMI VECTOR
450 OLDNMIHI  HEX    00
451
452 * SYSTEM VECTOR AND REGISTER LOCATIONS
453
454 CINVLO    =      $0314    ;SYSTEM IRQ VECTOR LOCATIONS
455 CINVHI    =      $0315
456 NMILO     =      $0318    ;SYSTEM NMI VECTOR LOCATIONS
457 NMIHI     =      $0319
458 SPRLOC    =      $07F8    ;SPRITE DATA POINTER LOCATION
```

FIG. 5 (Cont.)

Page 9

```
459 SPOX       =      $D000    ;SPRITE 0 LEAST SIGNIFICANT X POSTION BYTE
460 SPOY       =      $D001    ;SPRITE 0 Y POSITION BYTE
461 MSIGX      =      $D010    ;MOST SIGNIFICANT X BITS OF ALL SPRITES
462 SPENA      =      $D015    ;SPRITE ENABLE REGISTER
463 T12ALO     =      $DD04    ;CIA2 TIMER A LO BYTE
464 T12AHI     =      $DD05    ;CIA2 TIMER A HI BYTE
465 C12ICR     =      $DD0D    ;CIA2 INTERRUPT CONTROL REGISTER
466 CI2CRA     =      $DD0E    ;CIA2 CONTROL REGISTER
467
468 * EXTERNAL HARDWARE LOCATIONS
469
470 AD         =      $DE00    ;BASE ADDRESS OF A/D CONVERTOR
471 IRQFLAG    =      $DF00    ;ADDRESS OF HARDWARE IRQ FLIP FLOP
```

FIG. 5 (Cont.)

RADIO FREQUENCY TRACKING SYSTEM

This application is a Continuation-in-Part of application Ser. No. 08/155,359, filed on Oct. 6, 1993, now abandoned, which was a Continuation of application Ser. No. 07/863,312, filed on Mar. 20, 1992, now abandoned, which was a Continuation of application Ser. No. 07/621,447, filed Nov. 30, 1990, now abandoned.

BACKGROUND OF THE INVENTION

1. Field of the Invention

This invention relates generally to the field of devices for data entry into a computer system, and relates more particularly to an apparatus and method for inputting data based on an object within a specified field into a computer and using inputted data to move a virtual object on a display screen.

2. Description of the Relevant Art

Typically, devices such as keyboards, joy sticks, mice, and light pens are used to input data into a computer. A function of these input devices is to position a virtual object such as a cursor on the display screen of a computer. once the cursor is positioned at a desired location, the computer typically will be instructed to perform an operation. The processes of positioning the cursor and selecting the operation are discrete operations, since separate motions are required to perform each operation. With a mouse, for example, cursor positioning is accomplished by moving a mouse along the surface, while selection of the operation is accomplished by pushing keys located either on the mouse or on a separate keyboard. Mastering the operation of such input devices is often difficult because the hand movements required to operate the devices do not correspond to the visual feedback presented by the display screen of the computer. Furthermore, the operator's hand must be removed from the keyboard positioned on the mouse and then returned to the keyboard.

Glove input devices also have been used to supply data to computers. U.S. patent application Ser. No. 317107, now U.S. Pat. No. 4,988,981, by Thomas G. Zimmerman et al., and entitled "Computer Data Entry and Manipulation Apparatus and Method", describes one such glove input device. This glove input device allows the user to control the movement of a virtual object on a video display screen and perform an operation using a single movement of the operator's hand.

A problem with such a system is that it requires a wire connection between the object and the computer system to sense the operator's hand movement. The wire adds to the expense of the manufacture of the system, and may become twisted or broken affecting operation.

Another problem with prior glove input systems is the added expense necessary for the object sensing field. The glove system disclosed in U.S. patent application Ser. No. 317107 uses a low frequency magnetic field such as the 3SPACE™ system available from Polhemus Inc. of Colchester, Vermont to sense object movement. The wireless input control system in U.S. Pat. No. 4,654,648 uses an acoustical field to sense object movement. The creation of these sensing fields increases manufacturing costs of the computer system.

Tracking systems use software to generate the virtual object on the computer screen. The positioning of the virtual object typically uses triangulation to determine object position on the display screen. Using triangulation to determine object position necessitates knowledge of the distance of the object from the receiver, and computation can be complicated by determination of the squares or square root of the object to receiver distance. The present invention uses a simple averaging method of receiver signal strength to determine virtual object positioning on the computer display terminal; no distance calculation is required. Using this simpler averaging method increases computation speed and decreases complexity.

SUMMARY OF THE INVENTION

The present invention provides an inexpensive method and apparatus for transmitting data about an object within a defined field and using transmitted data to generate a virtual object on the display screen of a computer. In one embodiment of the present invention the object used to transmit input data is a wireless glove assembly. The tracking and display system uses a radio frequency signal to track the glove positioning, instead of a more expensive low frequency magnetic or acoustical field. Also, a single averaging method is used to determine the object position instead of the more complex triangulation method.

The glove assembly supports a transmitting device which transmits data bursts of gesture information at a radio frequency to four stationary receivers. The received signal is converted to a digital signal and input to a microprocessor control unit. The software used in the microprocessor control unit uses the inputted data to generate a virtual object on the computer display screen. The position of the virtual object is calculated based on the strength of the signal received. The movement of the virtual object on the computer display screen is in the same direction as and is proportional to the object movement.

BRIEF DESCRIPTION OF THE DRAWINGS

FIG. 5 is a source code listing of the software employed in a particular embodiment of the present invention which is used to sense the virtual object and translate the positional movements on a computer display terminal.

DETAILED DESCRIPTION OF THE PREFERRED EMBODIMENTS

FIGS. 1–5 of the drawings depict various preferred embodiments of the present invention for purposes of illustration only. One skilled in the art will recognize from the following discussion that alternative embodiments of the structures and methods illustrated herein may be employed without departing from the invention.

Figure 1:
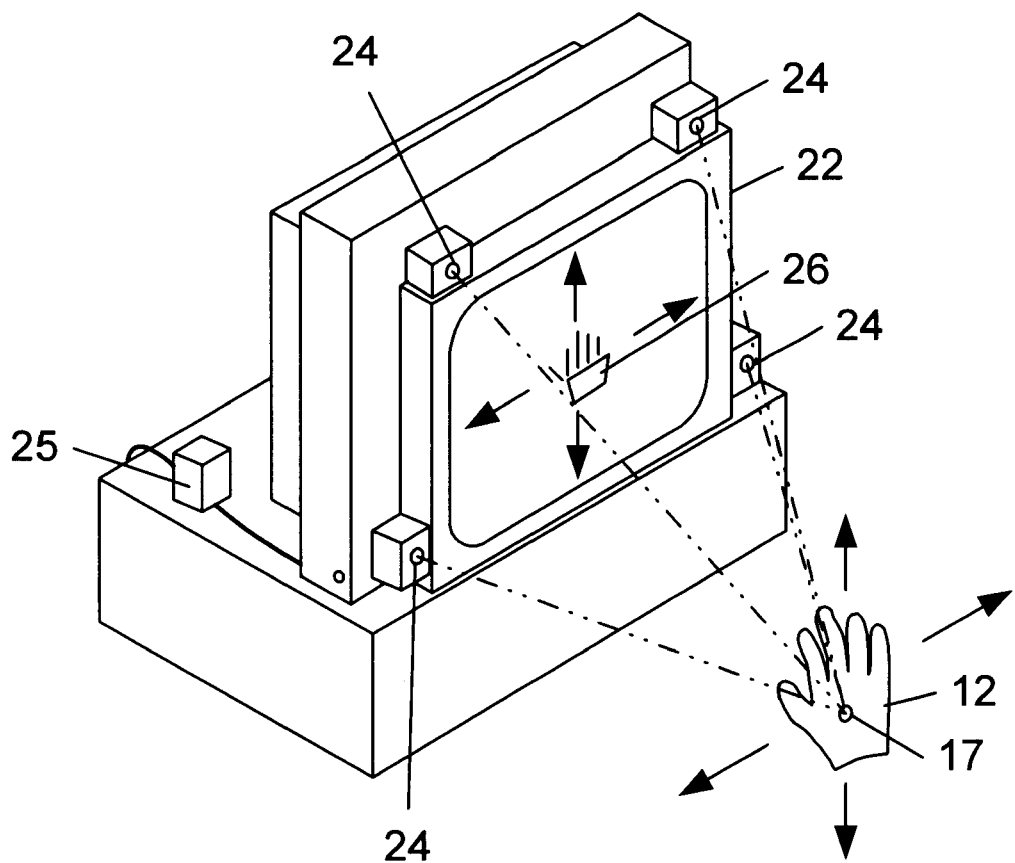
FIG. 1 is a perspective view of a particular embodiment of a wireless radio frequency tracking and display system invention.

In FIG. 1, a preferred embodiment of the present invention is illustrated in its intended mode of use, namely as a tracking system for an object within a defined space. The tracking system comprises a transmitting device 17, receiving devices 24, and an interface unit 25. The object in the preferred embodiment is a glove assembly 12 which supports a transmitting device 17. The transmitting device 17 transmits data bursts containing gesture information at a radio frequency to four stationary receivers 24. The received signal is converted to a digital signal in the interface 25 and input to a microprocessor control unit. The software used in the microprocessor control unit uses the inputted data to generate a virtual object 26 on the computer display screen.

In operation, the glove assembly is worn on the hand of an operator, and is used to position a cursor or other representative of the glove on the display screen of the computer. The glove assembly 12 typically consists of an inner (not shown) and outer glove. In one embodiment of the present invention, the transmitter is affixed to the inner glove. The inner glove also supports five sensors to detect the opening or closing of the finger positions. These sensors may be metal contacts affixed to the fingers and palm of the inner glove. When the switches of the glove are open, i.e. the sensors do not contact each other, the transmitting device sends out a high digital signal. When the finger positions are closed, i.e. the sensors are in contact with each other, a low digital signal is transmitted.

Figure 2:
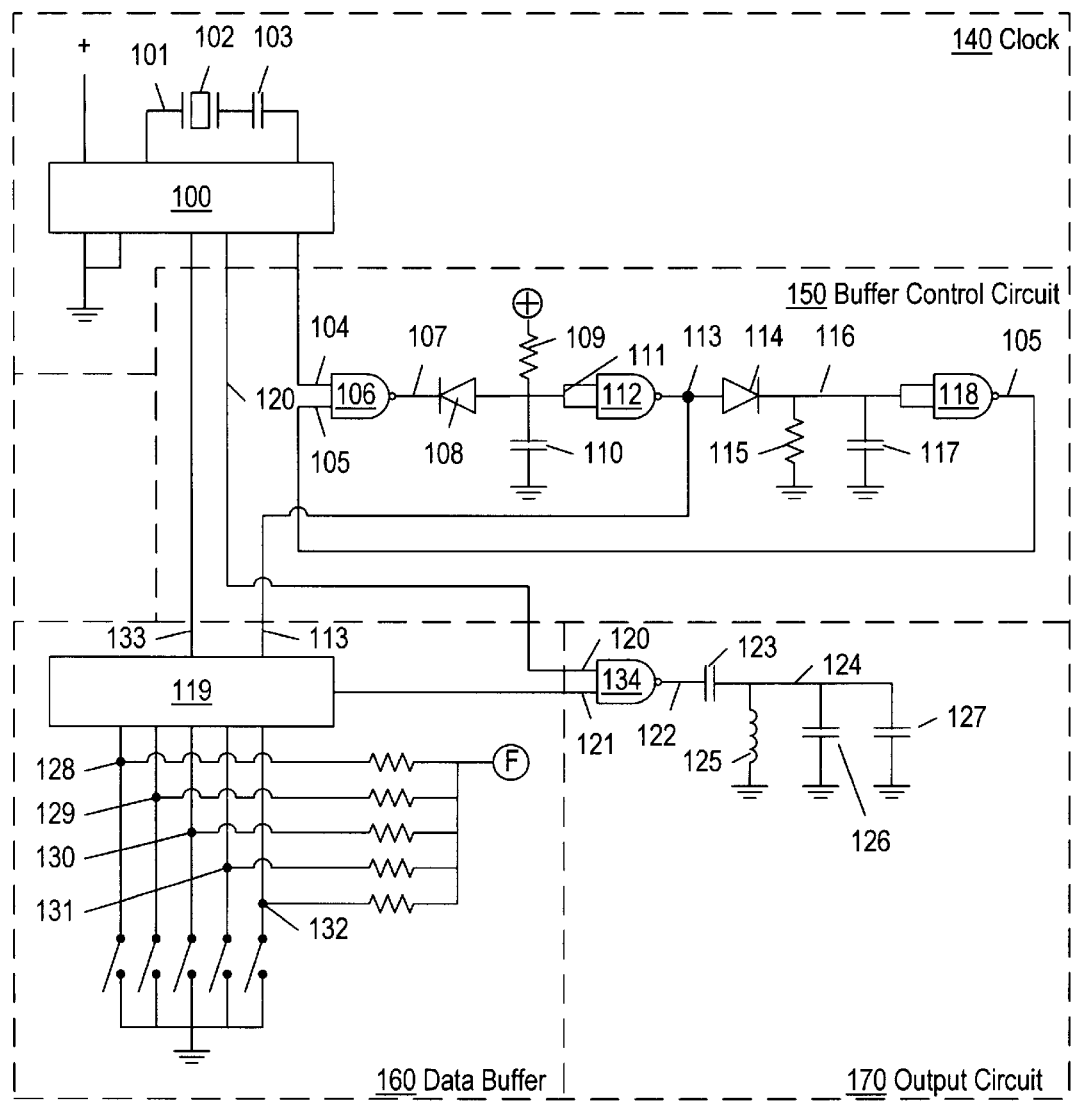
FIG. 2 is a circuit schematic of the circuitry in a particular embodiment used to transmit a radio frequency signal from the object to the receivers according to the present invention.

Data is transmitted to the receivers in radio frequency bursts of approximately 9.5 milliseconds in duration by the transmitter circuitry illustrated in FIG. 2. FIG. 2 is a circuit schematic of one embodiment of the circuitry used to transmit a radio frequency signal from the glove to the receivers. The transmitter 17 comprises a clock 140, a buffer control section 150, a data buffer 160, and an output circuit 170.

The clock 140 comprises a chip 100 which combines an oscillator and binary down counter function, such as the National Semiconductor CD4060. The chip 100 is coupled to a crystal 102 and a capacitor 103. In operation, the clock 140 generates a square wave on lines 104, 120, and 133. The chip 100 outputs an 884 Hz signal on line 133, a 218 Hz signal on line 104, and a 223,750 Hz signal on line 120. The 223,750 Hz square wave generated on line 120 serves as the carrier frequency for the radio frequency data burst.

The buffer control circuitry 150 controls the timing of the data transmission of the transmitter circuit 17. The buffer control circuit 150 comprises a NAND gate 106 which is coupled to the cathode of a diode 108. The anode of diode 108 is coupled to a resistor 109, a capacitor 110, and the input to NAND gate 112. The output of the NAND gate 112 is line 113 which is coupled to data buffer section 160. The output of NAND gate 113 is similarly coupled to the anode of diode 114. The cathode of diode 114 is coupled to the resistor 115 and the capacitor 117, and the input to NAND gate 118. The output of NAND gate 118 is fed back to the input of NAND gate 106.

The NAND gates 106, 112, and 118 exhibit characteristics similar to that of the National Semiconductor CD4093. The CD4093 has a logic threshold which is approximately 50% of the line supply voltage. This logic threshold value allows us to generate a sine wave out of the square wave generated in the clock 140, in conjunction with the choke coil 125 and capacitors 126 and 127 in the output circuit 170.

In operation, the buffer control circuitry 150 controls the timing of the data transmission of the circuit by controlling when data is sent into the data buffer. In the steady state, line 104 is low and no data is transmitted. When line 104 is low, a high data signal is output from the NAND gate 106. A high output from NAND gate 106 reverse biases diode 108 allowing 120K resistor 109 to charge the 0.01 $\mu$F capacitor 110 resulting in a high data input value to NAND gate 112 and a low data output signal on line 113.

Line 113 connects the buffer control circuit 150 to the data buffer section 160 and controls the input of data to the shift register 119. When line 113 is low, no data is input to the shift register 119 and therefore no data is transmitted. A high data signal on line 105, does not change the steady state since both values must be high to change the output of NAND gate 106. In order to transmit data, line 104 must be high. This, in conjunction with the high data signal on line 105, results in a low data output on line 107 which causes 0.01 $\mu$F capacitor 110 to discharge resulting in a high data signal on line 113.

The triggering to load transmit data into the shift register 119 occurs at about 218 Hz which is too fast a rate for the shift register 119 to shift out data. The buffer control circuitry 150 works by causing a delay in the transmission of the data signal. This delay is created by the RC load comprised of a 33K resistor 115 and the 1 $\mu$F capacitor 117 on line 116.

Data buffer 160 comprises a shift register 119, a series of resistors 134–138, and a series of switches 141 through 145. Shift register 119 is an 8-bit parallel in, serial out shift register. Line 113 is connected to pin 9 of shift register 119 and controls the input of data into the shift register. A high data signal on line 113 causes the shift register 119 to parallel load the data on lines 128–132 into the shift register 119.

The first two bits of the 8-bit shift register are not used for transmittal of data, but are held high so that the receivers have time to stabilize and accurate positional data is received. The next five bits of the shift register 119 are used for finger data. The data on lines 141–145 indicate whether the finger position is open or closed. If the finger position is open, a high data signal is sent to the shift register. If the finger position is closed, a low data signal is input into the shift register. The eighth bit of the shift register 119 is unused, and may be used to indicate, for example, whether the data signal is from a left or right glove, or whether the glove is in front of the receivers or in back of the receivers.

The data output circuitry 170 is comprised of a NAND gate 134, which is coupled to capacitor 123 which is coupled to choke coil 125, capacitor 126, and capacitor 127 in parallel. The output from shift register 119 and the 223,754 Hz signal from clock-circuitry 140 are input into NAND gate 134 so that line 122 modulates the carrier frequency. The output from line 122 is input into the antiresonance circuit which is slop tuned to 223,750 Hz. The 100 $\mu$H coil 125 acts as a cylindrically direction antenna to transmit data to the receivers.

Figure 3:
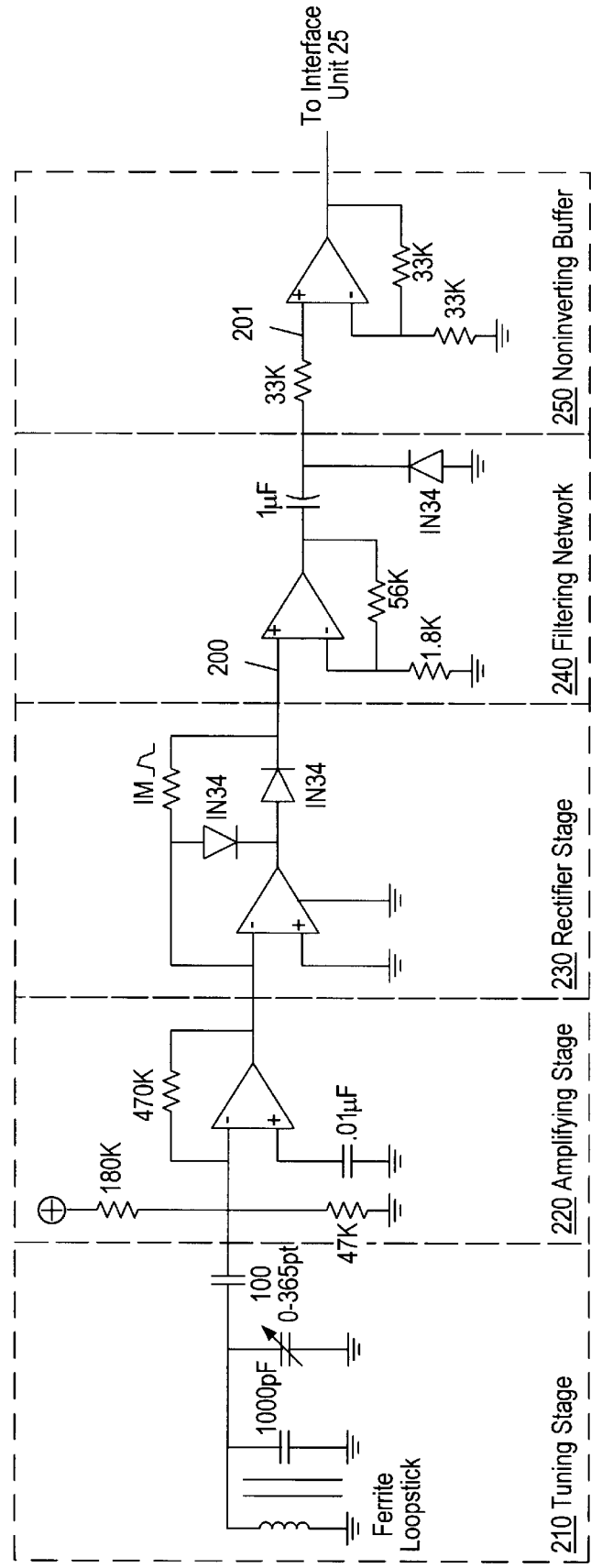
FIG. 3 is a circuit schematic of a particular embodiment the radio frequency receivers according to the present invention.

FIG. 3 is a circuit schematic of the receivers used in the tracking system. The receiver is comprised of a tuning stage 210, an amplifying stage 220, a rectifier stage 230, a filtering stage 240, and a non-inverting buffer 250.

The ferrite loop stick and two capacitors, together, form an antiresonance circuit which tunes the receiver to the same frequency as a transmitted signal in the glove. The transmitted signal is input into the first amplifying stage 220 and then rectified in the second stage 230 which acts as a half wave rectifier. The result at node 200 is an amplified unipolar signal that has been rectified. The amplified signal is then sent through a third stage 240 which acts as a filtering network to filter out the radio frequency signal and restores the DC level. The resulting signal at node 201 is the originally transmitted signal without the addition of the radio frequency signal and restored the DC level. The signal at node 201 is then sent through the fourth stage 250 which is a two-to-one non-inverting buffer. This resulting signal is sent to the interface unit shown in FIG. 4.

Figure 4:
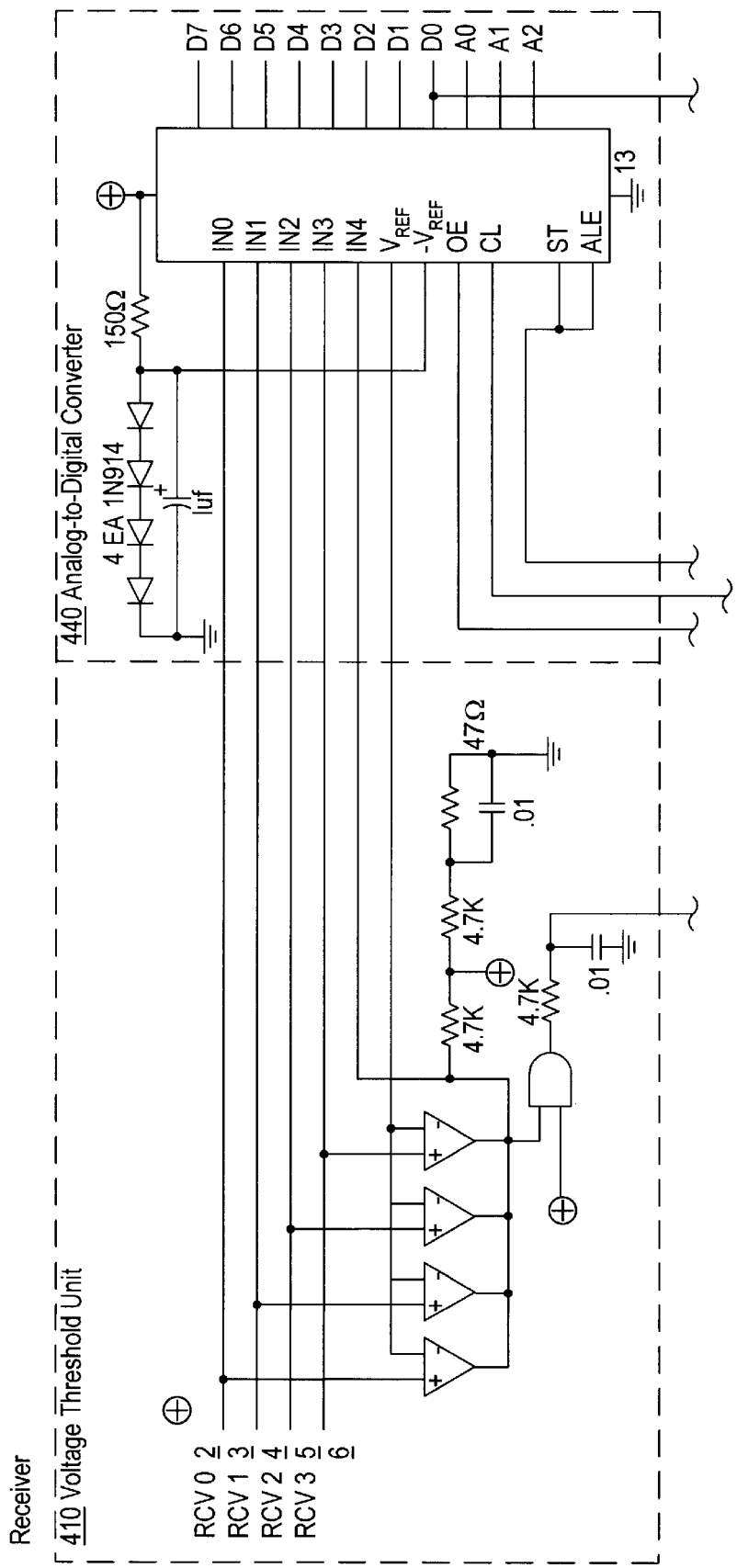
FIG. 4 is a circuit schematic of a particular embodiment of the interface used between the receivers and the microprocessor control unit in the present invention.
Figure 4:
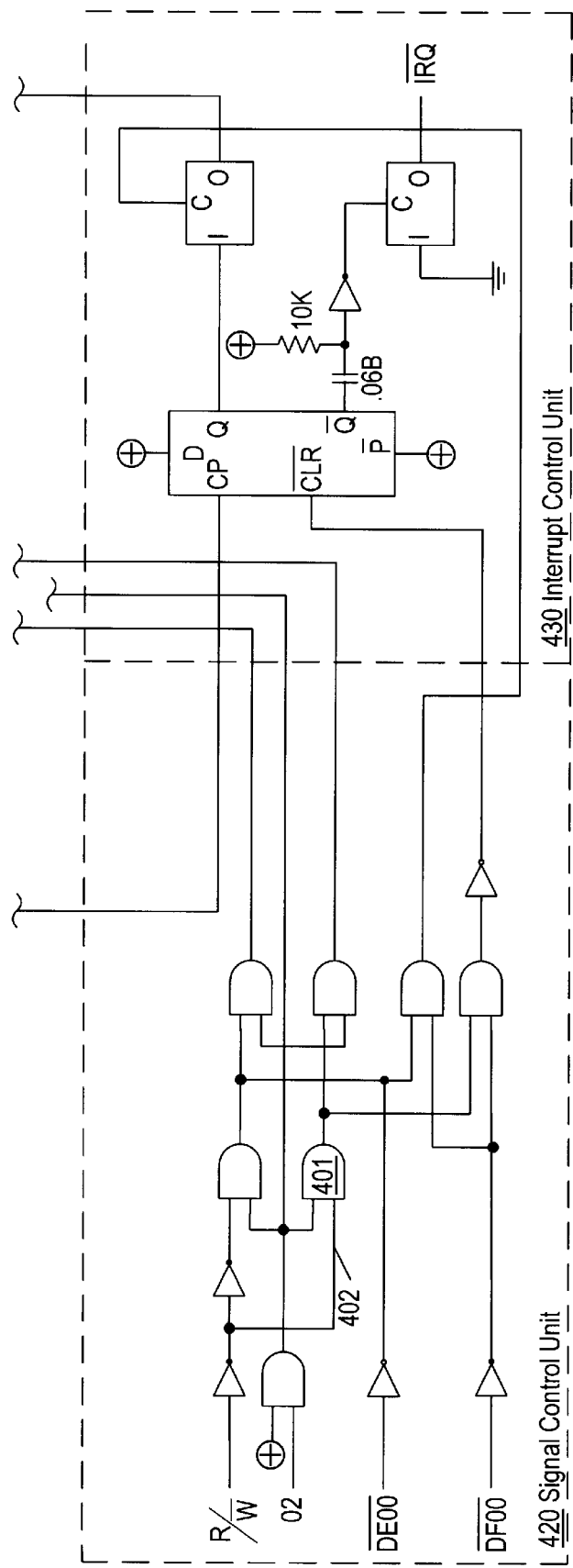

FIG. 4 is a circuit schematic of the interface 25 between the receivers 24 and the computer. The interface 25 comprises a voltage threshold unit 410, a signal control unit 420, an interrupt control unit 430 and an analog-to digital converter 440.

The receiver signals are input to the analog-to-digital converter 440 and the voltage threshold unit 410. The voltage threshold unit 410 comprises a series of comparators coupled to an RC network. The comparators have their negative inputs tied to the negative reference voltage. The output of the comparators are open collector and are wired together so that an interrupt is triggered when the threshold is exceeded by any of the receivers.

The negative reference leads of the comparators are tied to a network of resistors and capacitors in order to prevent false triggering. The RC network keeps both the analog-to-digital converter and the comparators at the same voltage level, which prevents false triggering. The NAND gate in series with the 4.7K resistor and 0.01 $\mu$F capacitor provides additional protection against false triggering by preventing terrestrial noise from triggering a false conversion process.

The signal control unit 420 controls the conversion of the analog signal to a digital signal, and the output of the converted signal to the microprocessor unit. In order to read a channel from the analog-to-digital converter, the accumulator must be loaded and then written to the zero channel (DE00). To perform a write operation, the data input signal to NAND gate 401 on line 402 must be high. A high signal on line 402 results in a high data signal to pins 22 and 6 of the analog-to-digital converter, enabling the address latch function and starting the conversion process for whatever address is on lines A0 through A1. The microprocessor must then wait 100 $\mu$sec before being able to read data output on the data bus D0 through D7.

The interrupt control unit 430 generates an interrupt signal on line IRQ4 to signal to the microprocessor that a data burst is ready to be read. The software, in an interrupt handling subroutine, clears the interrupt and stores the receiver data. The receiver data is used in determining gestures and also in the calculation of the position of a virtual object on the display screen.

FIG. 5 is a source code listing of the software currently used to determine the gesture and position of the object within the radio frequency field. In determining the position of the virtual object on the computer display terminal, the current code used does not use triangulation. Data is read from the four receivers and we have a known center of the screen. The code basically adds and subtracts the receiver values using combinations of two receivers at a time to get positional data. This addition and subtraction approximates the position of the virtual object by comparing the strength of the signals from two receiver values. The virtual object moves towards the receiver which has the higher value.

In determining signal strength, the receiver values are first scaled before calculations are performed. The receiver values are scaled such that the highest receiver value is 255 which is the maximum-output of the analog-to-digital converter on the interface. After the receiver values are read, the x, y, and z positions of the virtual object are calculated. The display screen is divided into a right and left side, and a top and bottom side. Receiver 0 is affixed to the bottom left corner of the prototype mounting. Receiver 1 is affixed to the top left corner of the mounting. Receivers 2 and 3 are on the right side of the prototype mounting; receiver 2 being in the top corner and receiver 3 being in the bottom corner.

The received signal strengths are optimized by the formula set forth at line 194 of FIG. 5.

In calculating the position of the virtual object, the display screen uses an averaging method instead of a triangulation method used in other tracking systems. This averaging method decreases computation time and simplifies the calculation of the position. The software first determines averages of the right and left values. The values of receivers 2 and 3 are added together and averaged by dividing the sum by 2. The values of receivers 1 and 0 are added together and divided by 2 to determine the average of those two values. The software then determines if the object is on the right or left side of the screen. To determine the X position, the center screen value is added to the right side value or the left-hand side value is subtracted from the center value.

A similar calculation is performed for determining the y position value. In determining the y position, the averages of the lower and upper receivers are calculated. The y position is then calculated, based on whether the object is in the upper or lower portion of the field. If the object is in the upper portion of the field, the y position is determined by subtracting the upper receiver value from the center screen value. If the object is in the lower portion of the screen, the y position is calculated by adding the lower receiver value to the center screen value.

The z value is calculated by averaging all four receiver values. In the code listing in FIG. 5, first the two left hand receiver values (receiver 0 and receiver 1) are added together and divided by two. Next the right hand receiver values (receiver 2 and receiver 3) are added together and divided by two. Finally, the two averages are added together and divided by two and multiplied by a Z scale as shown at line 183 of page 4 of FIG. 5 to give the z virtual object position.

The data burst includes gesture data. The software routine has a gesture recognition routine. The gesture recognition routine compares the current gesture with the old gesture. If there is a new gesture the gesture recognition routine compares it to the gestures stored in a gesture table. The routine continue searching through the table until it finds a gesture that matches the current gesture. This gesture table increases user flexibility, since it may easily be enlarged to include new gestures for new input values.

The foregoing is a description of the preferred embodiment of the invention. It should be understood that specific details, such as component types, have been provided to explain the construction of the invention. For example, in FIG. 4 the series of NAND gates and inverters in the signal control unit could be replaced with an address decoder chip. Furthermore, an object other than a glove may be used to transmit operational data. For example, a transmitting device could be affixed to a headset instead of a glove. A handicapped person could use a puff and blow mechanism to transmit operation data. For example, a light puff of air could represent the operation of moving a wheelchair to the right. The scope of the invention may be determined from the appended claims.

What is claimed is:

1. A system for estimating a position of an object, comprising:
   a transmitter, disposed on said object, which transmits signals;
   a plurality of receivers which receive the signals transmitted by the transmitter; and
   means for estimating a position of said object by averaging strengths of the signals received by at least some of said plurality of receivers.

2. A system according to claim 1, wherein:
   strengths of signals from a first plurality of receivers are used to estimate a position along an X axis and strengths of signals from a second plurality of receivers are used to estimate a position along a Y axis.

3. A system according to claim 1, wherein a position along a Z axis is estimated by averaging strengths of signals received by each of said plurality of receivers.

4. A system according to claim 1, wherein said transmitter is radio frequency transmitter.

5. A system according to claim 1, further comprising:

a display for displaying the estimated position of said object.

6. A system according to claim 1, wherein:

said object is a wireless glove assembly.

7. A system according to claim 1, further comprising:

means for generating a virtual object on a screen using an estimated position of said object determined by the means for estimating a position.

8. A system according to claim 1, wherein:

the means for estimating the position of said object inputs the signals received by each of the receivers, the strength of the signals input by the means for estimating corresponding to a distance between one of the receivers and the transmitter.

9. A method for estimating a position of an object comprising the steps of:

transmitting a signal by a transmitter which is disposed on said object;

receiving said transmitted signal by a plurality of receivers; and estimating a position of said object by averaging strengths of signals received by at least some of said plurality of receivers.

10. A method according to claim 9, wherein:

said estimating step uses strengths of signals from a first plurality of receivers to estimate a position along an X axis, and uses strengths of signals from a second plurality of receivers to estimate a position along a Y axis.

11. A method according to claim 9, wherein:

said estimating step uses strengths of signals from each of said plurality of receivers to estimate a position along a Z axis.

12. A method according to claim 9, wherein said transmitting step transmits radio frequencies.

13. A method according to claim 9, further comprising the step of:

displaying the estimated position of said object.

14. A method according to claim 9, wherein:

said object is a wireless glove assembly and said step of transmitting a signal by a transmitter disposed on said object transmits a signal by the transmitter which is disposed on the wireless glove assembly.

15. A method according to claim 9, further comprising the step of:

generating a virtual object on a screen using an estimated position of said object determined by the step of estimating a position.

16. A method according to claim 9, wherein:

the step of estimating the position of said object inputs the signals received by each of the receivers, the strength of the signals input by the step of estimating corresponding to a distance between one of the receivers and the transmitter.

* * * * *